US010373060B2

(12) United States Patent
Boxwell et al.

(10) Patent No.: US 10,373,060 B2
(45) Date of Patent: Aug. 6, 2019

(54) ANSWER SCORING BY USING STRUCTURED RESOURCES TO GENERATE PARAPHRASES

(71) Applicant: International Business Machines Corporation, Armonk, NY (US)

(72) Inventors: Stephen A. Boxwell, Columbus, OH (US); Jared M. Smythe, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 809 days.

(21) Appl. No.: 14/886,023

(22) Filed: Oct. 17, 2015

(65) Prior Publication Data
US 2017/0109354 A1   Apr. 20, 2017

(51) Int. Cl.
*G06N 5/04* (2006.01)
*G06N 3/00* (2006.01)
*G06N 20/00* (2019.01)
*G06F 16/34* (2019.01)

(52) U.S. Cl.
CPC .......... *G06N 5/047* (2013.01); *G06F 16/345* (2019.01); *G06N 3/006* (2013.01); *G06N 20/00* (2019.01)

(58) Field of Classification Search
CPC . G06F 17/3053; G06F 17/3043; G06N 3/006; G06N 99/005; G06N 5/047
See application file for complete search history.

(56) References Cited

U.S. PATENT DOCUMENTS

| 7,519,529 | B1* | 4/2009 | Horvitz ................. G06F 17/279 |
| | | | 369/30.04 |
| 7,546,235 | B2 | 6/2009 | Brockett et al. |
| 8,271,453 | B1 | 9/2012 | Pasca et al. |
| 8,346,792 | B1 | 1/2013 | Baker et al. |
| 8,554,540 | B2 | 10/2013 | Lee et al. |
| 9,613,025 | B2* | 4/2017 | Heo ..................... G06F 17/2785 |
| 2009/0119090 | A1 | 5/2009 | Niu et al. |
| 2012/0078888 | A1* | 3/2012 | Brown .............. G06F 17/30654 |
| | | | 707/723 |

(Continued)

OTHER PUBLICATIONS

Berant et al, Semantic Parsing via Paraphrasing, Jun. 22-27, 2014, 52nd Annual Meeting of the Association for Computational Linguistics, ACL 2014—Proceedings of the Conference, pp. 1415-1425.*

(Continued)

*Primary Examiner* — Kamran Afshar
*Assistant Examiner* — Brent Johnston Hoover
(74) *Attorney, Agent, or Firm* — VanLeeuwen & VanLeeuwen; William J. Stock

(57) ABSTRACT

An approach is provided in which a knowledge manager creates a pattern set that includes paraphrases and corresponding paraphrase scores. The paraphrase scores are based on a set of first candidate answers obtained from querying a first set of resource data. The knowledge manager performs a search, which is based on the paraphrases and a user question, on a second set of resource data and identifies a set of second candidate answers. In turn, the knowledge manager scores the set of second candidate answers based on the paraphrase scores corresponding to the paraphrases utilized to identify the set of second candidate answers.

17 Claims, 9 Drawing Sheets

(56) References Cited

U.S. PATENT DOCUMENTS

2013/0226846 A1* 8/2013 Li .......................... G06N 5/02
706/12
2015/0331850 A1* 11/2015 Ramish ............... G06F 17/2785
704/9

OTHER PUBLICATIONS

Elizabeth et al, Improving QA processing by semantic reformulation, Jan. 9-11, 2013, 2013 International Conference on Computer Communication and Informatics (ICCCI-2013), Coimbatore, India.*
Kauchak et al, Paraphrasing for Automatic Evaluation, Jun. 2006, Proceedings of the Human Language Technology Conference of the North American Chapter of the ACL, pp. 455-462.*
Zhao et al, Application-driven Statistical Paraphrase Genreration, Aug. 2-7, 2009, Proceedings of the 47th Annual Meeting of the ACL and the 4th IJCNLP of the AFNLP, pp. 834-842.*
Fader et al., "Paraphrase-Driven Learning for Open Question Answering," University of Washington, The 51st Annual Meeting of the Association for Computational Linguistics (ACL 2013), Sofia, Bulgaria, Aug. 4-9, 2013, 11 pages.
Berant et al., "Semantic Parsing via Paraphrasing," 52nd Annual Meeting of the Association for Computational Linguistics, ACL 2014—Proceedings of the Conference, Baltimore, Maryland, Jun. 22-27, 2014, pp. 1415-1425.
Zhao et al., "Query Paraphrasing Towards Better Search by Incorporating Coordinate Relationship," DEIM2015 The 7th Forum on Data Engineering and Information Management, Koriyama, Japan, Mar. 2015.
Bishop et al., "Mapping Questions to Complex Database Lookups using Synthetic Events," U.S. Appl. No. 14/816,186, filed Aug. 3, 2015, 49 pages.
Bishop et al., "Scoring Automatically Generated Language Patterns for Questions using Synthetic Events," U.S. Appl. No. 14/186,200, filed Aug. 3, 2015, 50 pages.
Boxwell et al.,"Information Retrieval Using Structured Resources for Paragraph Resolution," U.S. Appl. No. 14/886,020, filed Oct. 17, 2015, 40 page.
"List of IBM Patents or Patent Applications Treated as Related," Letter from Leslie A. Van Leeuwen, Oct. 17, 2015, 1 page.

* cited by examiner

ANSWER SCORING BY USING STRUCTURED RESOURCES TO GENERATE PARAPHRASES

BACKGROUND

The present disclosure relates to creating sets of scored paraphrases based on a structured resource and using the sets of scored paraphrases to identify and score candidate answers that correspond to a user question.

A traditional search engine produces the most accurate answers when words in a question match a passage in a corpus of documents in the same order. For example, if the traditional search engine receives a question of "Who is the president of Company ABC?", the traditional search engine produces accurate results if the corpus includes a document with the passage "Bill Smith is the president of Company ABC." If a passage in the corpus of documents does not closely match the words of the question in order, the traditional search engine is less likely to produce an accurate answer.

In reality, a corpus of documents may not have matching paraphrases, but rather have passages that include answers to a question such as "Bill Smith leads Company ABC", "The CEO of Company ABC is Bill Smith", or "Company ABC's Chairperson is Bill Smith". Unfortunately, the traditional search engine may not detect information in these passages to determine candidate answers.

BRIEF SUMMARY

According to one embodiment of the present disclosure, an approach is provided in which a knowledge manager creates a pattern set that includes paraphrases and corresponding paraphrase scores. The paraphrase scores are based on a set of first candidate answers obtained from querying a first set of resource data. The knowledge manager uses the paraphrases to perform a search on a second set of resource data and identify a set of second candidate answers. In turn, the knowledge manager scores the set of second candidate answers based on the paraphrase scores corresponding to the paraphrases utilized to identify the set of second candidate answers.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
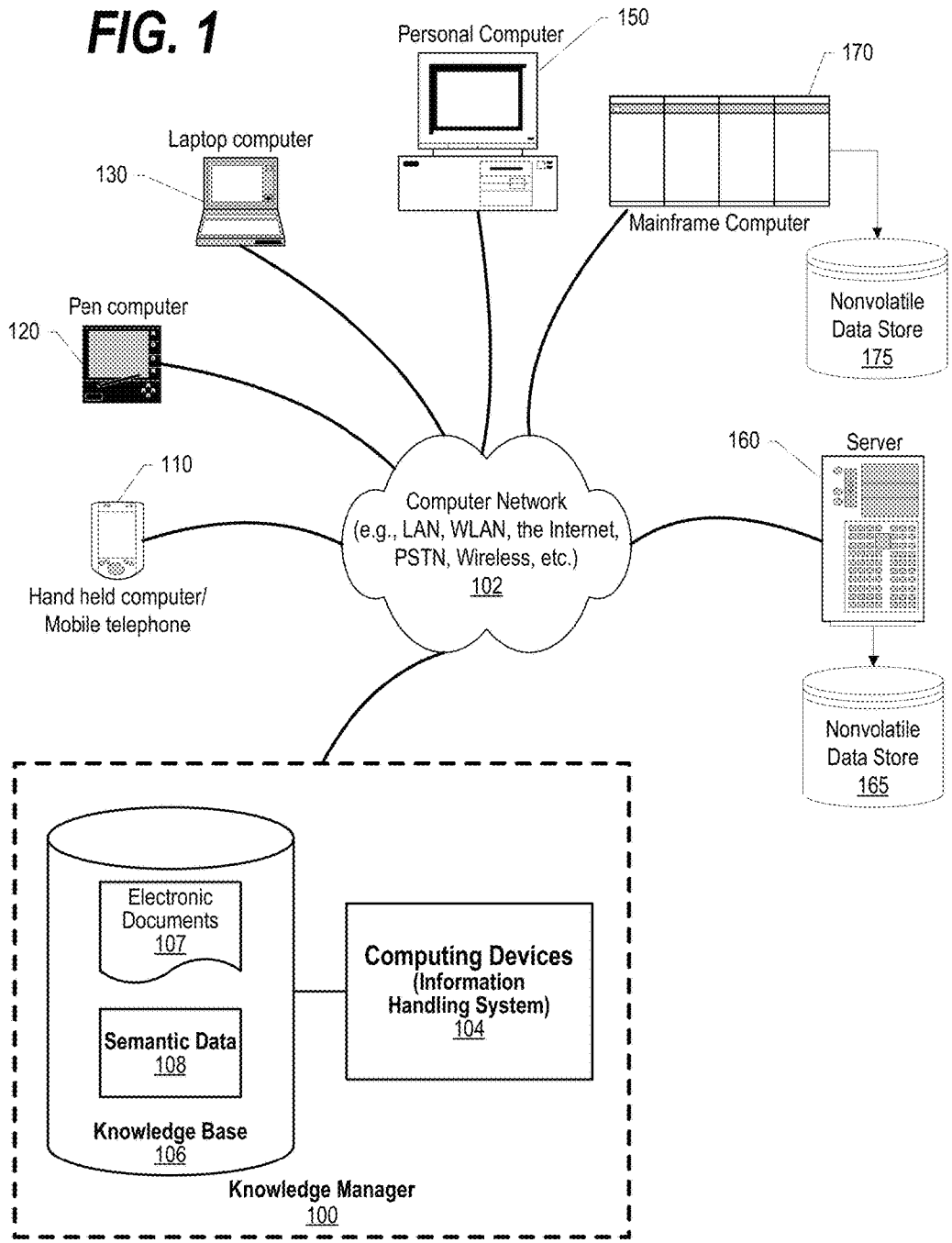
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 depicts a schematic diagram of one illustrative embodiment of a question/answer creation (QA) system 100 in a computer network 102. Knowledge manager 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. Knowledge manager 100 and network 102 may enable question/answer (QA) generation functionality for one or more content users. Other embodiments of knowledge manager 100 may be used with components, systems, sub-systems, and/or devices other than those that are depicted herein.

Knowledge manager 100 may be configured to receive inputs from various sources. For example, knowledge manager 100 may receive input from the network 102, a corpus of electronic documents 106 or other data, a content creator 108, content users, and other possible sources of input. In one embodiment, some or all of the inputs to knowledge manager 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured resource sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 100. The document 106 may include any file, text, article, or source of data for use in knowledge manager 100. Content users may access knowledge manager 100 via a network connection or an Internet connection to the network 102, and may input questions to knowledge manager 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 100 may interpret the question and provide a response to the content user containing one or more answers to the question. In some embodiments, knowledge manager 100 may provide a response to users in a ranked list of answers.

In some illustrative embodiments, knowledge manager 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize knowledge manager 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 100. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
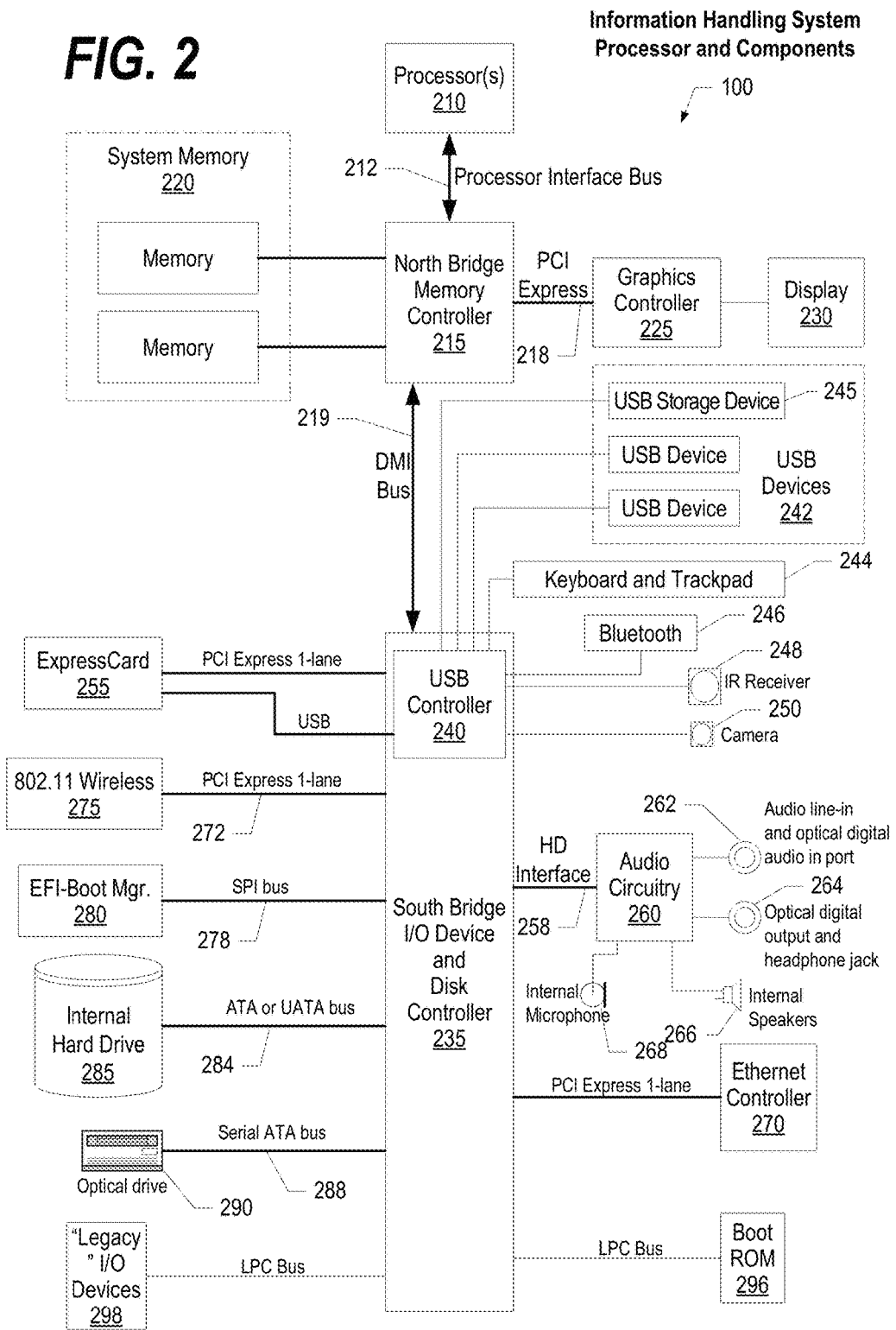
FIG. 2 provides an extension of the information handling system environment shown in FIG. 1 to illustrate that the methods described herein can be performed on a wide variety of information handling systems which operate in a networked environment.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE .802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3 through 9 depict an approach that can be executed on an information handling system. The information handling system analyzes training data against a structured resource and creates pattern sets that each include semantically similar paraphrases and corresponding syntactic patterns. The information handling system also includes paraphrase scores in the pattern sets that are based on a set of first candidate answers obtained from querying the structured resource. When the information handling system receives a user question, the information handling system generates a syntactic pattern of the question and compares the generated syntactic pattern to the syntactic patterns in the pattern sets. When a match is found, the information handling system retrieves paraphrases from the pattern set containing the matched syntactic pattern. The information handling system then generates new questions based on the retrieved paraphrases and utilizes the new questions to create a second query that queries a second set of data, such as an unstructured resource, which identifies a set of candidate answers. In turn, the information handling system scores the set of second candidate answers based on the paraphrase scores corresponding to the paraphrases utilized to identify the candidate answers.

Figure 3:
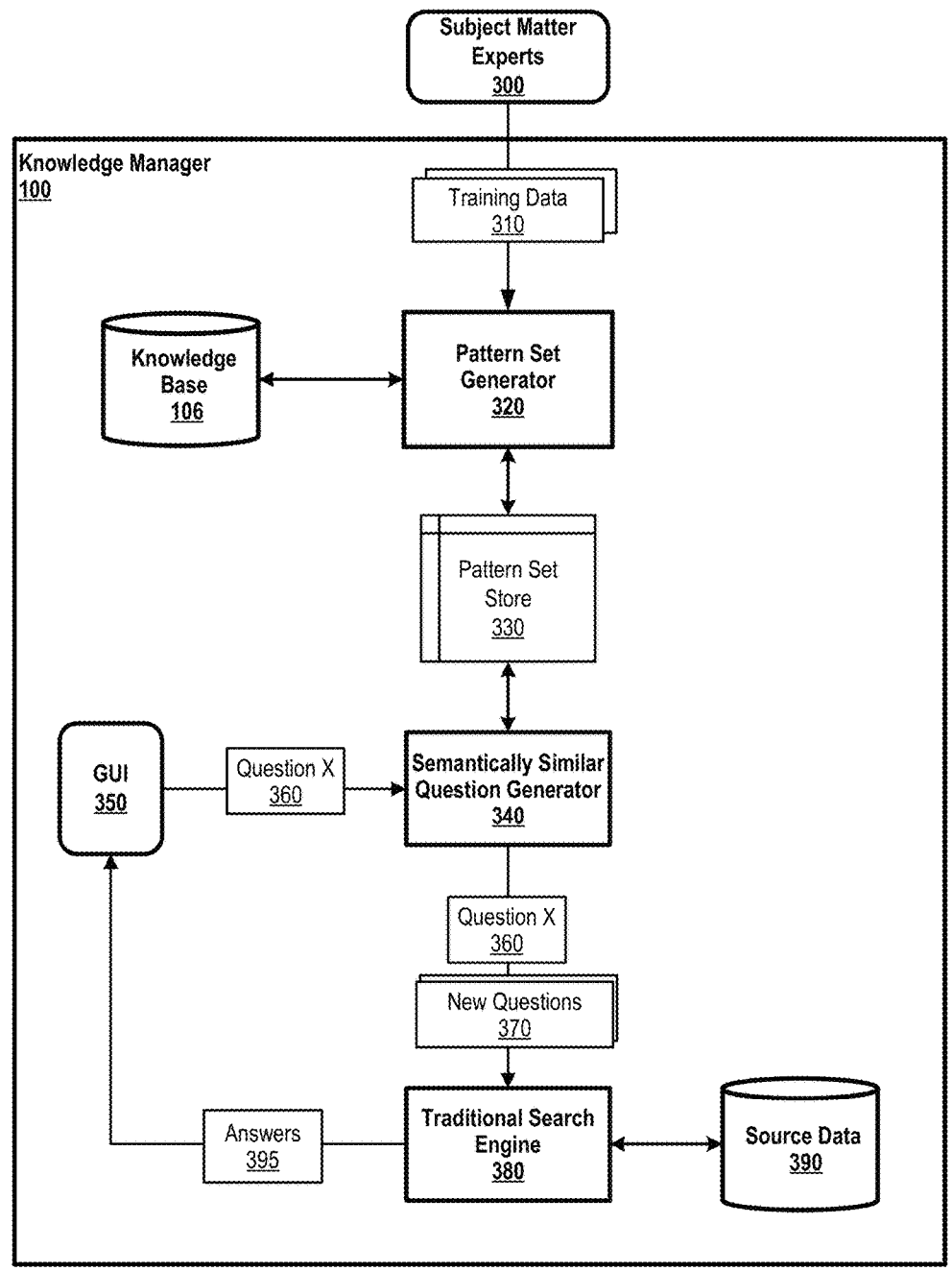
FIG. 3 is an exemplary diagram depicting a knowledge manager that groups semantically similar paraphrases into pattern sets and utilizes the semantically similar paraphrases to generate new questions for use in a traditional search engine.

FIG. 3 is an exemplary diagram depicting a knowledge manager that groups semantically similar paraphrases into pattern sets and utilizes the semantically similar paraphrases to generate new questions for use in a traditional search engine.

Knowledge manager 100 receives training data 310 from subject matter experts 300. In one embodiment, training data 310 includes training question/answer pairs. In another embodiment, training data 310 includes training sentences or statements that encompass training questions and answers. For each training pair, pattern set generator 320 generates a training syntactic pattern, a training paraphrase, and a training query. In one embodiment, pattern set generator 320 uses knowledge base 106, which includes structured resource data, to generate the training queries.

Pattern set generator 320 compares a newly generated training query against previously generated training queries stored in pattern set store to determine whether a match exists. If a match exists between a newly generated training query and a previously generated training query, pattern set generator 320 stores, in pattern set store 330, a corresponding new training paraphrase and a new training syntactic pattern in a pattern set corresponding to the matched previously generated training query. Once pattern set generator 320 finishes evaluating training data 310, pattern set store 330 stores pattern sets that each include multiple syntactic patterns and corresponding semantically similar paraphrases. For example, one of pattern set store 330's pattern sets may include semantically similar paraphrases such as "Y is the CEO of X", "Y leads X", and "Y is the boss of X" (see FIG. 4 and corresponding text for further details).

In one embodiment, pattern set generator 320 assigns paraphrase scores to paraphrases, which indicate a relative accuracy of a corresponding training query to the training pair when the training query queries knowledge base 106. For example, if a training question is "What countries border the United States?" and the training query returned "Canada", the corresponding paraphrase may be assigned a score of 50%.

A user question, such as question X 360, is provided through GUI 350. Question X 360 may not be related to knowledge base 106. Semantically similar question generator 340 creates a syntactic pattern from question X 360 and compares the syntactic pattern against syntactic patterns stored in pattern store 330. When semantically similar question generator 340 finds a match in a pattern set, semantically similar question generator 340 retrieves paraphrases from the matching pattern set and generates new questions 370.

In turn, semantically similar question generator 340 provides question X 360 and new questions 370 to traditional search engine 380. Traditional search engine 380 generates queries based on the received questions and queries resource data in source data 390, which corresponds to question X 360. For example, if question X 360 is "How fast does the Ford Mustang go," source data 390 may include unstructured data obtained from automotive articles. In turn, traditional search engine 380 provides candidate answers 395 resulting from the query to the user through GUI 350. In one embodiment, the candidate answers 395 may be scored based upon the paraphrase scores assigned to the paraphrases by pattern set generator 320 discussed above (see FIGS. 7 through 9 and corresponding text for further details).

Figure 4:
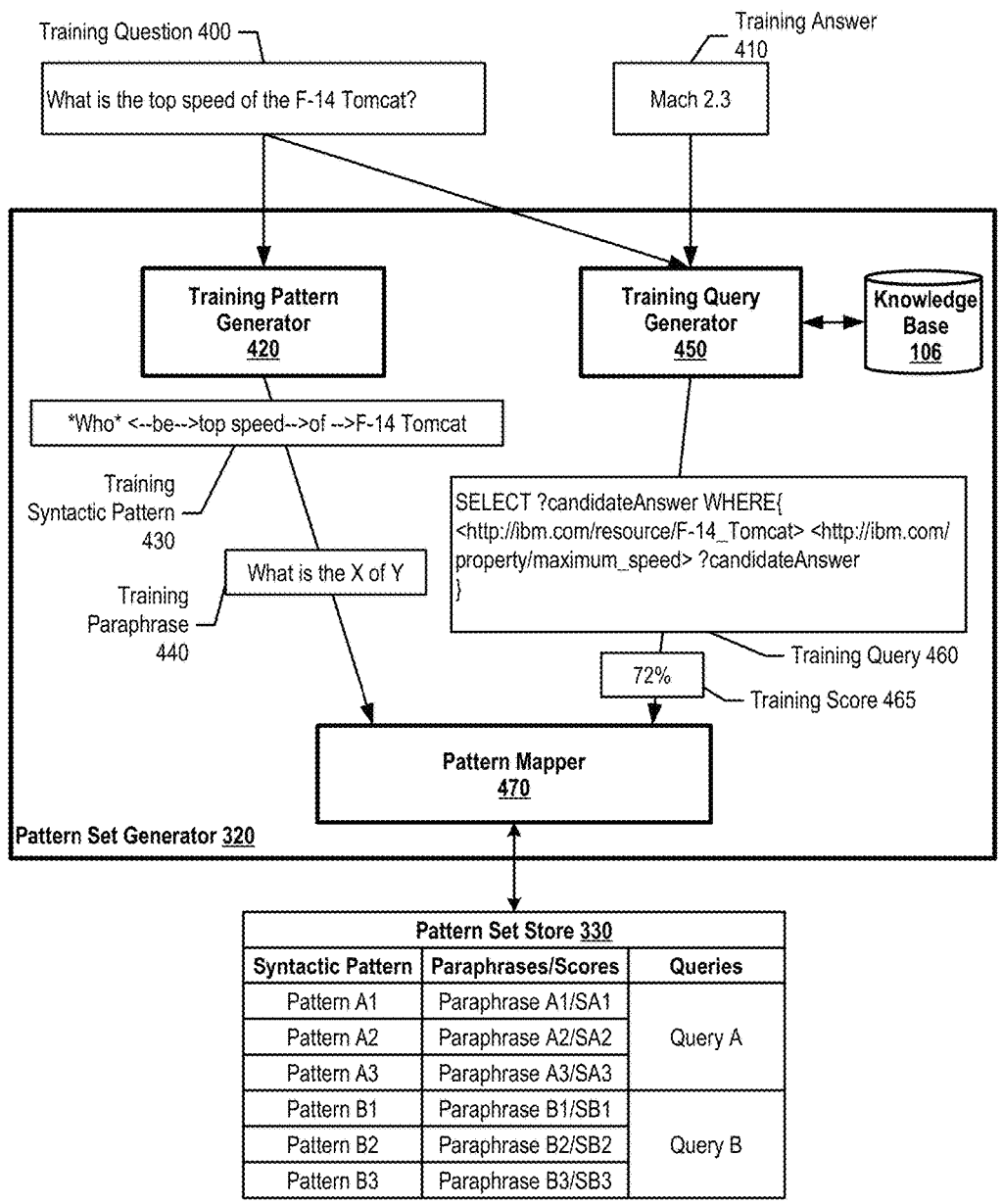
FIG. 4 is a diagram depicting a pattern set generator grouping semantically similar paraphrases and corresponding syntactic patterns into pattern sets.

FIG. 4 is a diagram depicting a pattern set generator grouping semantically similar paraphrases and corresponding syntactic patterns into pattern sets. Pattern set generator 320 receives training data that includes training question 400 and training answer 410. Training pattern generator 420, in one embodiment, uses training question 400 to generate a focus phrase. In this embodiment, training pattern generator 420 then uses the focus phrase to generate training syntactic pattern 430 based upon the syntactic relationships between training entities within the focus phrase. Training pattern generator 420 also generates training paraphrase 440 based on training question 400.

Training query generator 450 identifies database paths in knowledge base 106 (e.g., a structured resource) that the training question 400 to training answer 410. For example, training query generator 450 finds a database path between the top speed of the F-14 Tomcat and Mach 2.3 in knowledge base 106. In turn, training query generator 450 generates training query 460.

In one embodiment, training query generator 450 queries knowledge base 106 using training query 460 and compares the returned answers with training answer 410 to generate a training score. For example, if a training question is "What countries boarder the United States," the training answers include Canada and Mexico. In this example, if a training query returned only Canada, the training score would not be as high as a training query that returned both Canada and Mexico. Training query generator 450, in turn, produces training score 465, which are assigned to training paraphrase 440 by pattern mapper 470 (discussed below).

Pattern mapper 470 compares training query 460 with previously generated training queries in in pattern set store 330 to identify matches or correlations. A match or correlation between training queries indicates semantic similarities between paraphrases within the pattern set. When pattern mapper 470 detects a match or correlation, pattern mapper 470 stores training syntactic pattern 430, training paraphrase 440, and training score 465 in the pattern set corresponding to the matched previously generated training query.

Figure 7:
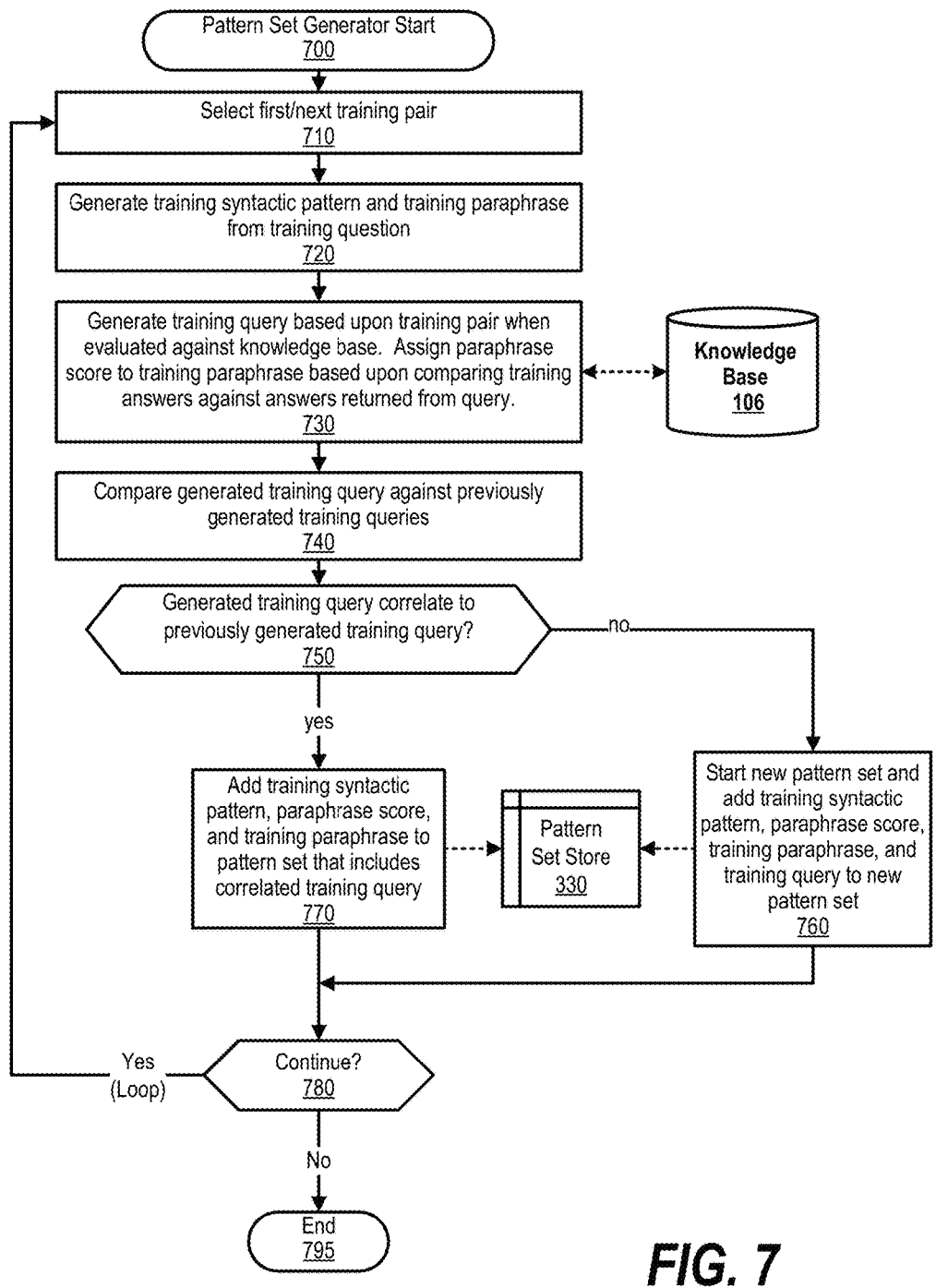
FIG. 7 is an exemplary flowchart showing steps taken by a knowledge manager to generate pattern sets from training data.

However, when pattern mapper 470 does not detect a match or correlation, pattern mapper 470 creates a new pattern set and stores training syntactic pattern 430, training paraphrase 440, training score 465, and training query 460 in the new pattern set (see FIG. 7 and corresponding text for further details). FIG. 4 shows that pattern set store 330 includes two pattern sets A and B, each of which includes three syntactic patterns and corresponding paraphrases/scores.

Figure 5:
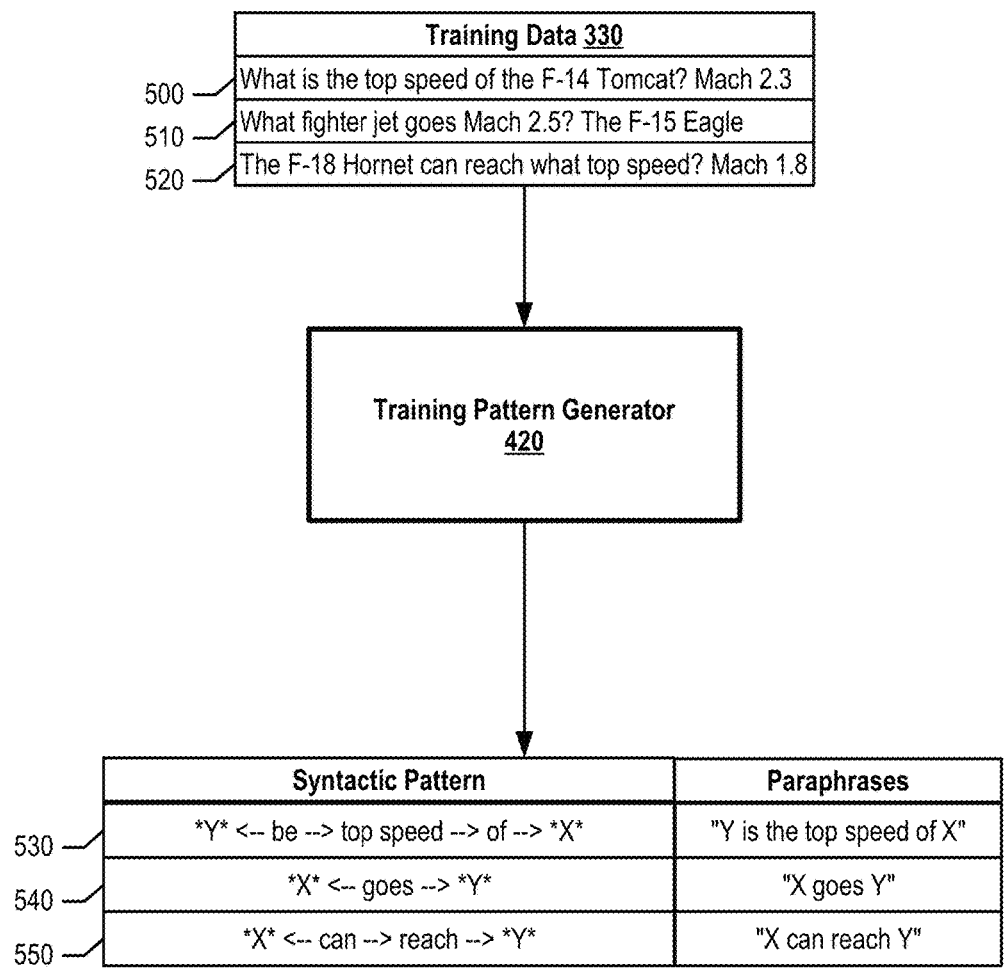
FIG. 5 is an exemplary diagram depicting a training pattern generator creating training syntactic patterns and paraphrases based upon training data.

FIG. 5 is an exemplary diagram depicting a training pattern generator creating training syntactic patterns and paraphrases based upon training data.

Training data 330 includes three training pairs 500, 510, and 520. From training data 330, training pattern generator 420 generates three sets of training syntactic patterns and corresponding paraphrases, which are included in entries 530, 540, and 550. As such, when a user question is received whose syntactic pattern matches one of the syntactic patterns in entries 530, 540, or 550, semantically similar question generator 340 generates new questions based upon the paraphrases in entries 530, 540, and 550. For example, if a user question is "How fast is the Ford Mustang?", semantically similar question generator 340 replaces X with "The Ford Mustang" and generates new questions: "What is the top speed of the Ford Mustang?," "The Ford mustang goes what?," and "The Ford mustang can reach what?" (see FIG. 6 and corresponding text for further details).

Figure 6:
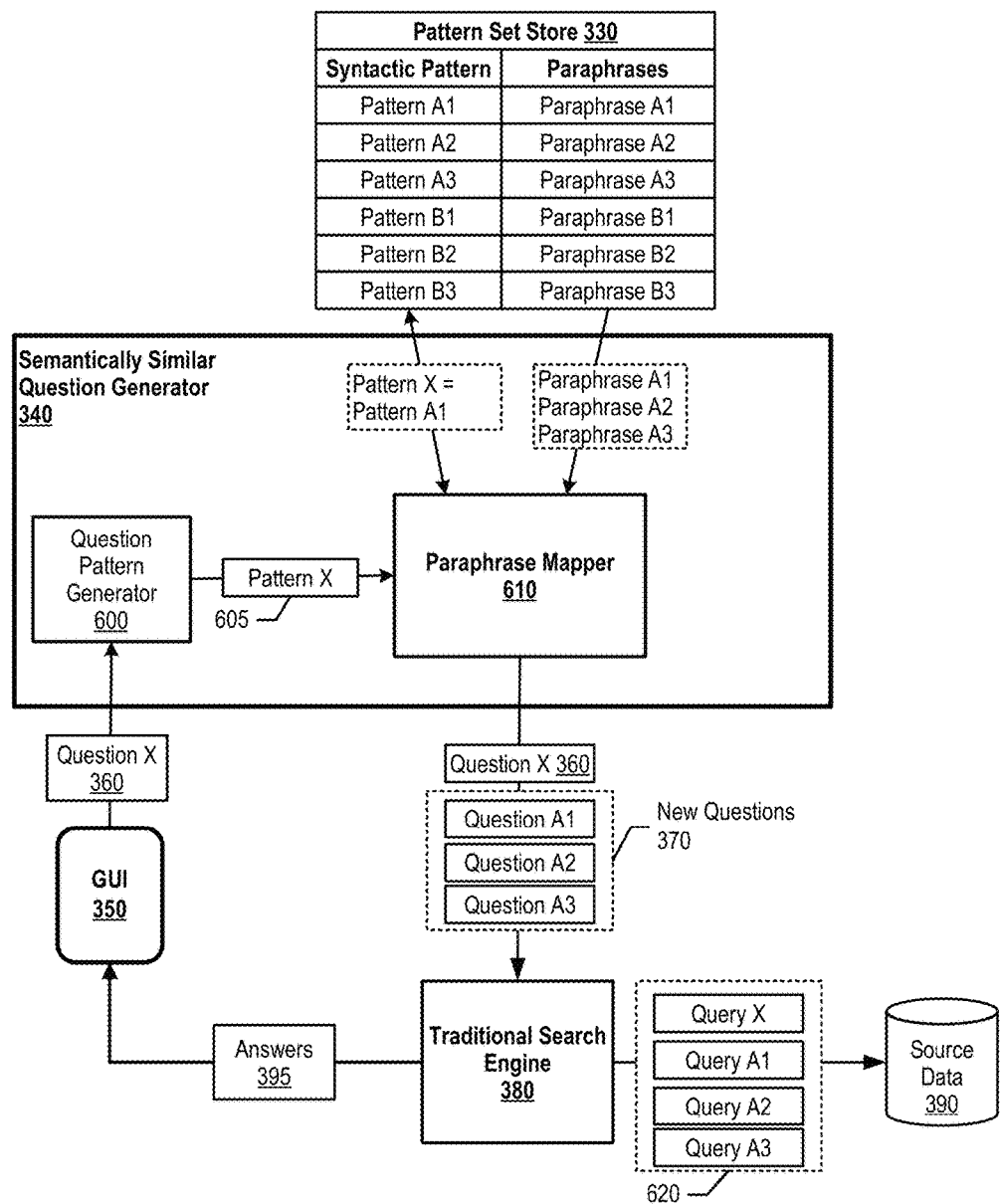
FIG. 6 is an exemplary diagram depicting a semantically similar question generator matching a user question's syntactic pattern to a syntactic pattern in a pattern set and generating new questions based upon paraphrases included in the pattern set.

FIG. 6 is an exemplary diagram depicting a semantically similar question generator matching a user question's syntactic pattern to a syntactic pattern in a pattern set and generating new questions based upon paraphrases included in the pattern set.

Question pattern generator 600 receives question X 360 and generates syntactic pattern X 605. Paraphrase mapper 610 compares pattern X 605 against syntactic patterns in pattern set store 330. When paraphrase mapper 610 detects a match, such as pattern X=pattern A1 shown in FIG. 6, paraphrase mapper 610 retrieves paraphrases from the matching pattern set. As can be seen, paraphrase mapper 610 retrieves paraphrases A1, A2 and A3 because pattern X=pattern A1 which is in pattern set A.

In turn, paraphrase mapper 610 generates new questions 370 from paraphrases A1, A2 and A3 by replacing variables in the paraphrases with corresponding nouns, verbs, etc. in question X 360. For example, if question X is "How fast does the Ford Mustang go" and paraphrase A1 is "What is the X of Y," paraphrase mapper generates the question of "What is the top speed of the Ford Mustang?"

Traditional search engine 380 generates queries 620 based on question X 360 and new questions 370. In turn, traditional search engine 380 scores the candidate answers from the queries, such as based on paraphrase scores previously assigned to the paraphrases, and provides answers 395 to a user through GUI 350.

FIG. 7 is an exemplary flowchart showing steps taken by a knowledge manager to generate pattern sets from training data. FIG. 7 processing commences at 700 whereupon, at step 710, the process selects a first training pair, training sentence, or training statement. At step 720, the process generates a training syntactic pattern and a training paraphrase from a training question included in the training pair.

At step 730, the process generates a training query based upon the training pair when evaluated against knowledge base 106 as discussed previously. In one embodiment, the process assigns a paraphrase score to the training paraphrase based upon comparing training answers received from the training query against training answers in the training pair.

At step 740, the process compares the generated training query against previously generated training queries in pattern set store 330. The process determines as to whether the generated training query matches (or correlates) to one of the previously generated training query (decision 750). If the generated training query does not match one of the previously generated training queries, then decision 750 branches to the 'no' branch. At step 760, the process creates a new pattern set and adds the training syntactic pattern, paraphrase score, training paraphrase, and training query to the new pattern set.

On the other hand, if the generated training query matches one of the previously generated training queries, then decision 750 branches to the 'yes' branch. At step 770, the process adds the training syntactic pattern, paraphrase score, and training paraphrase to the pattern set that includes the matched training query.

The process determines as to whether to continue (decision 780). If the process should continue, then decision 780 branches to the 'yes' branch which loops back to select and process the next training pair. This looping continues until each training pair has been processed, at which point decision 780 branches to the 'no' branch exiting the loop. FIG. 7 processing thereafter ends at 795.

Figure 8:
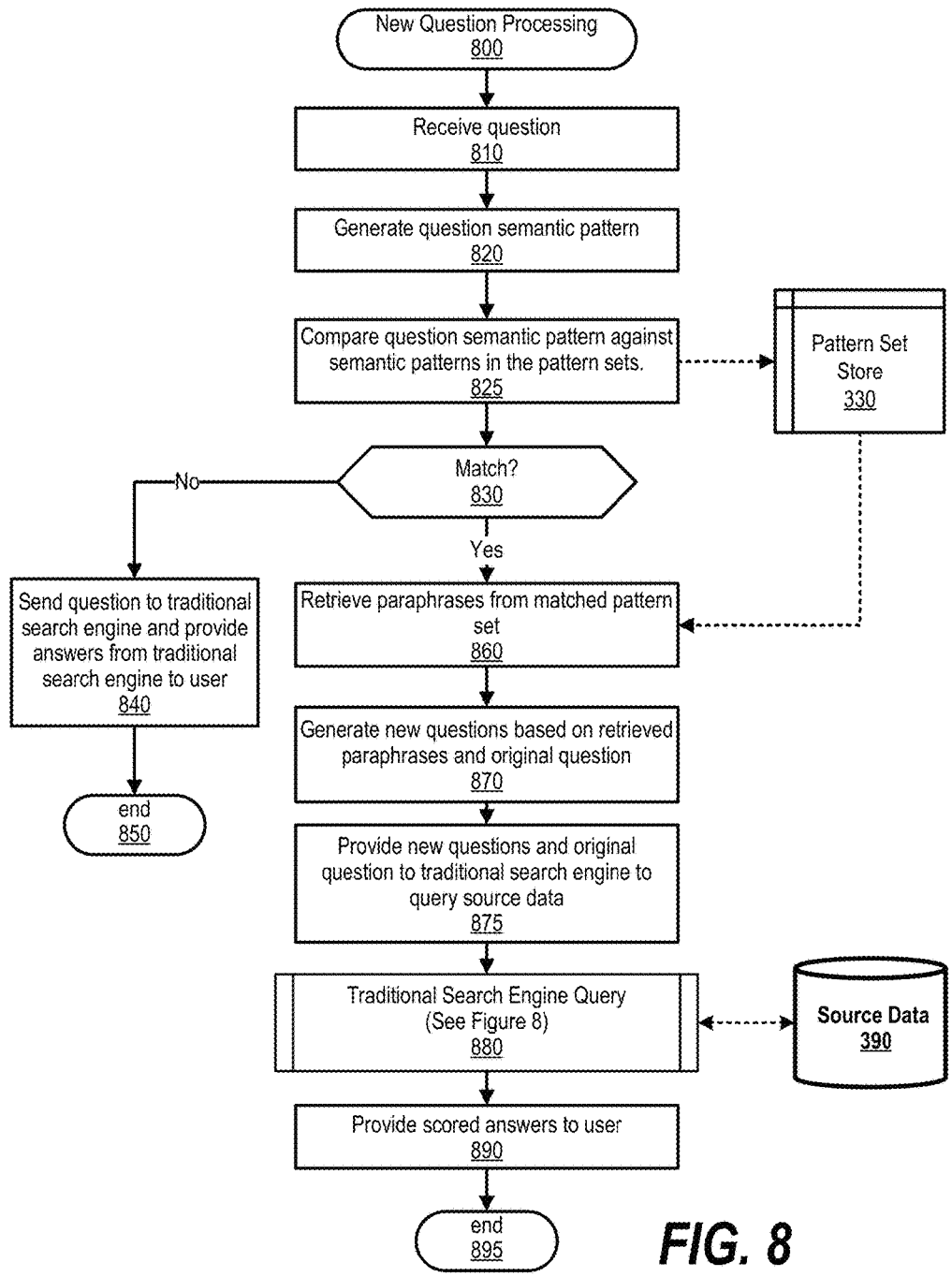
FIG. 8 is an exemplary flowchart showing steps taken by a knowledge manager to match a question's syntactic pattern to semantic patterns in a pattern set and generate new questions based upon paraphrases found in a pattern set corresponding to a matched syntactic pattern.

FIG. 8 is an exemplary flowchart showing steps taken by a knowledge manager to match a question's syntactic pattern to semantic patterns in a pattern set and generate new questions based upon paraphrases found in a pattern set corresponding to a matched syntactic pattern.

FIG. 8 processing commences at 800 whereupon, at step 810, the process receives a question and at step 820, generates a question semantic pattern from the received question. At step 825, the process compares the question semantic pattern against pattern set semantic patterns found in pattern set store 330.

The process determines as to whether a match (or correlation) exists between the question semantic pattern and semantic patterns found in pattern store 330 (decision 830). If a match is not found, then decision 830 branches to the 'no' branch and the process sends the question to a traditional search engine to process. FIG. 8 processing thereafter ends at 850.

On the other hand, if a match is found between the question semantic pattern and one of the semantic patterns stored in pattern set store 330, then decision 830 branches to the 'yes' branch. At step 860, the process retrieves paraphrases from the pattern set that includes the matched semantic pattern. At step 870, the process generates new questions based on the retrieved paraphrases and the original question as discussed previously.

At step 875, the process provides new questions and the original user question to a traditional search engine to perform a query. At predefined process 880, the process generates new questions from the paraphrases and queries a resource on source data 390 using the newly generated questions. (see FIG. 8 and corresponding text for processing details). Source data 390 may include, for example, unstructured data that corresponds to the original question. At step 890, the process provides scored answers to a user and FIG. 8 processing thereafter ends at 895.

Figure 9:
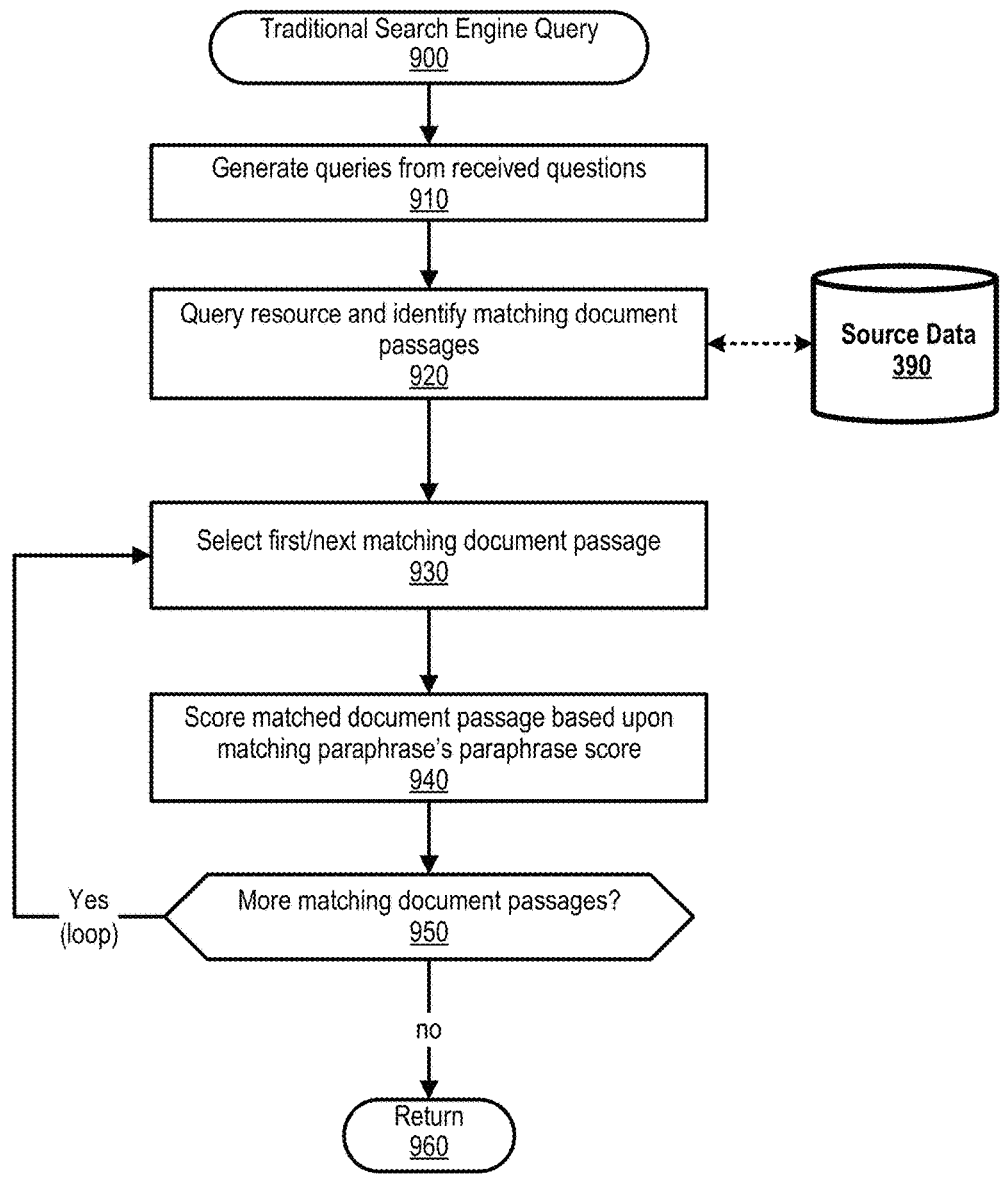
FIG. 9 is an exemplary flowchart showing steps taken to generate new questions from paraphrases and perform a query on a resource.

FIG. 9 is an exemplary flowchart showing steps taken to generate new questions from paraphrases and perform a query on a resource. FIG. 9 processing commences at 900 whereupon, at step 910, the process generates queries based upon the original user question and the new questions generated as discussed earlier. At step 920, the process queries source data 390 using the generated queries and identifies document passages that are returned by the query.

At step 930, the process selects the first matching document passage and, at step 940, the process scores the matched document passage based upon the matching paraphrase's paraphrase score, which was generated at step 730 during the training stage.

The process determines as to whether there are more matching document passages to evaluate (decision 950). If there are more matching document passages to evaluate, then decision 950 branches to the 'yes' branch which loops back to select the next document passage. This looping continues until there are no more document passages to evaluate, at which point decision 950 branches to the 'no' branch exiting the loop. This looping continues until there are no more document passages to evaluate, at which point decision 950 branches to the 'no' branch exiting the loop. FIG. 9 processing thereafter ends at 960.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:

creating a pattern set that comprises a plurality of paraphrases and a plurality of paraphrase scores, wherein the plurality of paraphrase scores are based on a plurality of query answers obtained from querying a first set of resource data, the creating further comprising:
    generating a first one of the plurality of paraphrases and a first query utilizing a first set of training data;
    using the first query to query the first set of resource data and produce a first query answer, wherein the first query answer is included in the plurality of query answers;
    generating a first one of the plurality of paraphrase scores based upon comparing the first query answer against a training answer included in the first set of training data; and
    assigning the first paraphrase score to the first paraphrase based on the first paraphrase being generated from the first set of training data;
utilizing the plurality of paraphrases and a user question to perform a search on a second set of resource data, wherein the search results in a set of candidate answers corresponding to the user question;
in response to determining that the first paraphrase was utilized to identify the selected candidate answer in the second set of resource data, assigning the first paraphrase score to a selected one of the candidate answers; and
providing the selected candidate answer to a user based on the assigned score.

2. The method of claim 1 wherein the first set of training data is selected from the group consisting of a training question/answer pair and a training statement.

3. The method of claim 2 further comprising:
retrieving a second set of training data;
creating a second one of the plurality of paraphrases and a second query based on the second set of training data;
comparing the second query to the first query; and
in response to determining that the second query correlates to the first query, adding the second paraphrase to the pattern set.

4. The method of claim 1 wherein the pattern set includes a plurality of first syntactic patterns, the method further comprising:
    generating a second syntactic pattern based on the user question;
    creating a plurality of new questions utilizing the plurality of paraphrases in response to matching one of the plurality of first syntactic patterns to the second syntactic pattern; and
    utilizing the plurality of new questions to perform the search on the second set of resource data.

5. The method of claim 4 wherein the creating of the plurality of new questions further comprises:
    selecting one or more terms in the user question; and
    replacing one or more variables in the plurality of paraphrases with the selected one or more terms.

6. The method of claim 1 wherein the first set of resource data is structured data, and wherein the second set of resource data is unstructured data.

7. An information handling system comprising:
one or more processors;
a memory coupled to at least one of the processors; and
a set of computer program instructions stored in the memory and executed by at least one of the processors in order to perform actions of:
    creating a pattern set that comprises a plurality of paraphrases and a plurality of paraphrase scores, wherein the plurality of paraphrase scores are based on a plurality of query answers obtained from querying a first set of resource data, the creating further comprising:
        generating a first one of the plurality of paraphrases and a first query utilizing a first set of training data;
        using the first query to query the first set of resource data and produce a first query answer, wherein the first query answer is included in the plurality of query answers;
        generating a first one of the plurality of paraphrase scores based upon comparing the first query answer against a training answer included in the first set of training data; and
        assigning the first paraphrase score to the first paraphrase based on the first paraphrase being generated from the first set of training data;
    utilizing the plurality of paraphrases and a user question to perform a search on a second set of resource data, wherein the search results in a set of candidate answers corresponding to the user question;
    in response to determining that the first paraphrase was utilized to identify the selected candidate answer in the second set of resource data, assigning the first paraphrase score to a selected one of the candidate answers; and
    providing the selected candidate answer to a user based on the assigned score.

8. The information handling system of claim 7 wherein the first set of training data is selected from the group consisting of a training question/answer pair and a training statement.

9. The information handling system of claim 8 wherein at least one of the one or more processors perform additional actions comprising:
    retrieving a second set of training data;
    creating a second one of the plurality of paraphrases and a second query based on the second set of training data;
    comparing the second query to the first query; and
    in response to determining that the second query correlates to the first query, adding the second paraphrase to the pattern set.

10. The information handling system of claim 7 wherein the pattern set includes a plurality of first syntactic patterns, and wherein at least one of the one or more processors perform additional actions comprising:
    generating a second syntactic pattern based on the user question;
    creating a plurality of new questions utilizing the plurality of paraphrases in response to matching one of the plurality of first syntactic patterns to the second syntactic pattern; and
    utilizing the plurality of new questions to perform the search on the second set of resource data.

11. The information handling system of claim 10 wherein at least one of the one or more processors perform additional actions comprising:
    selecting one or more terms in the user question; and
    replacing one or more variables in the plurality of paraphrases with the selected one or more terms.

12. The information handling system of claim 7 wherein the first set of resource data is structured data, and wherein the second set of resource data is unstructured data.

13. A computer program product stored in a computer readable storage medium, comprising computer program code that, when executed by an information handling system, causes the information handling system to perform actions comprising:

creating a pattern set that comprises a plurality of paraphrases and a plurality of paraphrase scores, wherein the plurality of paraphrase scores are based on a plurality of query answers obtained from querying a first set of resource data, the creating further comprising:

generating a first one of the plurality of paraphrases and a first query utilizing a first set of training data;

using the first query to query the first set of resource data and produce a first query answer, wherein the first query answer is included in the plurality of query answers;

generating a first one of the plurality of paraphrase scores based upon comparing the first query answer against a training answer included in the first set of training data; and assigning the first paraphrase score to the first paraphrase based on the first paraphrase being generated from the first set of training data;

utilizing the plurality of paraphrases and a user question to perform a search on a second set of resource data, wherein the search results in a set of candidate answers corresponding to the user question;

in response to determining that the first paraphrase was utilized to identify the selected candidate answer in the second set of resource data, assigning the first paraphrase score to a selected one of the candidate answers; and providing the selected candidate answer to a user based on the assigned score.

14. The computer program product of claim 13 wherein the first set of training data is selected from the group consisting of a training question/answer pair and a training statement.

15. The computer program product of claim 14 wherein the information handling system performs additional actions comprising:

retrieving a second set of training data;

creating a second one of the plurality of paraphrases and a second query based on the second set of training data;

comparing the second query to the first query; and in response to determining that the second query correlates to the first query, adding the second paraphrase to the pattern set.

16. The computer program product of claim 13 wherein the pattern set includes a plurality of first syntactic patterns, and wherein the information handling system performs additional actions comprising:

generating a second syntactic pattern based on the user question;

creating a plurality of new questions utilizing the plurality of paraphrases in response to matching one of the plurality of first syntactic patterns to the second syntactic pattern; and utilizing the plurality of new questions to perform the search on the second set of resource data.

17. The computer program product of claim 16 wherein the information handling system performs additional actions comprising:

selecting one or more terms in the user question; and replacing one or more variables in the plurality of paraphrases with the selected one or more terms.

* * * * *